(12) United States Patent
Kaeser et al.

(10) Patent No.: US 6,554,686 B1
(45) Date of Patent: Apr. 29, 2003

(54) SAWING WIRE AND METHOD FOR THE CUTTING AND LAPPING OF HARD BRITTLE WORKPIECES

(75) Inventors: Maximilian Kaeser, Burghausen (DE); Christian Andrae, Tussling (DE)

(73) Assignee: Wacker Siltronic Gesellschaft fur Halbleitermaterialien AG, Burghausen (DE)

( * ) Notice: Subject to any disclaimer, the term of this patent is extended or adjusted under 35 U.S.C. 154(b) by 29 days.

(21) Appl. No.: 09/593,617

(22) Filed: Jun. 13, 2000

(30) Foreign Application Priority Data

Aug. 5, 1999 (DE) .......................... 199 36 834

(51) Int. Cl.$^7$ ................................ B24B 1/00
(52) U.S. Cl. .................. 451/36; 125/16.02; 125/21; 451/41
(58) Field of Search ................ 125/16.01, 16.02, 125/21; 451/36, 37, 41, 57, 58

(56) References Cited

U.S. PATENT DOCUMENTS 5,216,999 A * 6/1993 Han ..................... 125/21
6,131,558 A * 10/2000 Weber .................. 125/21

FOREIGN PATENT DOCUMENTS

| JP | 354016794 A | * | 2/1979 |
| JP | 1-281865 | | 11/1989 |
| JP | 7-314435 | * | 12/1995 |
| JP | 8-216012 | | 8/1996 |
| JP | 10-138114 | | 5/1998 |
| JP | 11-42547 | | 2/1999 |
| JP | 411221749 | * | 8/1999 |
| JP | 11-254288 | * | 9/1999 |
| JP | 411254288 | * | 9/1999 |
| JP | 411277402 | * | 10/1999 |
| JP | 411348029 | * | 12/1999 |

OTHER PUBLICATIONS

English Patent Abstract of Japan corresponding to JP1–281865.
English Patent Abstract of Japan corresponding to JP8–216012.
English Patent Abstract of Japan corresponding to JP11–42547.
English Patent Abstract of Japan corresponding to JP10–138114.
L. Wick: Staalkabels: Geometrie en levensduur, Oct. 7, 1986, Dissertation Technische Universiteit Delft, Delft XP002152141.

* cited by examiner

Primary Examiner—Timothy V. Eley
(74) Attorney, Agent, or Firm—Collard & Roe, P.C.

(57) ABSTRACT

A sawing wire is for the simultaneous cutting and lapping of a multiplicity of wafers from a hard brittle workpiece. The sawing wire exhibits torsion. There is also a method for cutting and lapping using the sawing wire.

6 Claims, 1 Drawing Sheet

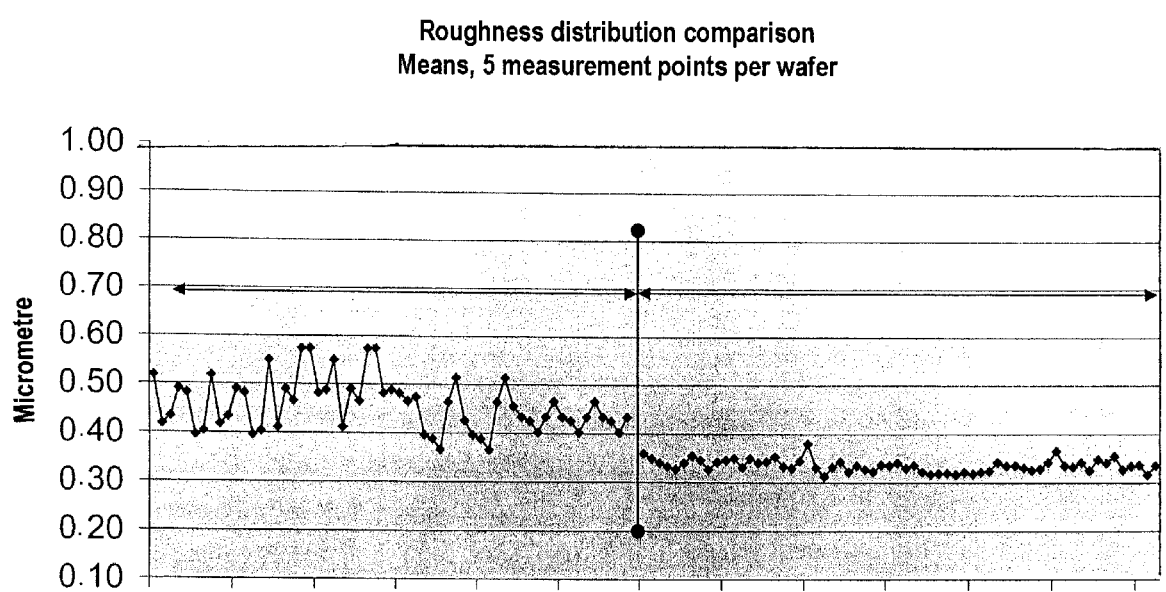
Figure

SAWING WIRE AND METHOD FOR THE CUTTING AND LAPPING OF HARD BRITTLE WORKPIECES

BACKGROUND OF THE INVENTION

1. Field of the Invention

The present invention relates to a sawing wire for the simultaneous cutting and lapping of a multiplicity of wafers from a hard brittle workpiece. The present invention also relates to a method for cutting and lapping using a sawing wire.

2. The Prior Art

A wire saw which is suitable in particular for the production of semiconductor wafers, and the operating principle on which a wire saw is based, are described, for example, in U.S. Pat. No. 5,771,876.

Generally, wire saws are equipped with wire-guide rollers, over which an endless sawing wire is guided helically, so that a sawing harp or a cutting or wire web is formed. The workpiece is guided through the wire web by an advancing movement and is split into wafers when it passes through the web. The sawing wire is either moved in the same direction over the entire cutting run or is moved to and fro (oscillating wire movement). The cutting-lapping agent used is abrasive grains of different grain sizes and different hardnesses, which are suspended in a carrier liquid.

The quality of the cut, i.e. the quality of the wafer surfaces and the wafer geometries is dependent in the first instance on uniform distribution of the cutting-lapping agent along the width of the web. However, sawing wires according to the prior art generally do not carry the amount of cutting-lapping agent which is available on the wire web optimally into the cutting gap.

SUMMARY OF THE INVENTION

It is an object of the present invention to avoid the abovementioned drawbacks of the prior art, to improve the geometry of the wafers and surface parameters, such as the striations, roughness and rippling, and to shorten the process times.

The above object is achieved according to the invention by means of a method for the simultaneous cutting and lapping of a multiplicity of wafers from a hard brittle workpiece using a sawing wire which runs helically over wire-guide rollers and forms a wire web, and a cutting-lapping agent in a wire saw, wherein the sawing wire executes a rotary movement during the cutting and lapping.

Surprisingly, it has been found that the use of a sawing wire with a defined torsion leads to a rotation of the wire during the cutting and lapping. This rotary movement, which is similar to a boring movement, promotes the distribution of the cutting-lapping agent on the wire web and in particular the supply of cutting-lapping agent to the cutting gap. Preferably, the sawing wire rotates while it is being guided over the wire web. The sawing wire preferably rotates 1 to 10 times, particularly preferably 2 to 5 times, over a wire length of 1500 mm.

Accordingly, this object of the invention is also achieved by means of a sawing wire for the simultaneous cutting and lapping of a multiplicity of wafers from a hard brittle workpiece, wherein the sawing wire exhibits torsion.

The torsion of the sawing wire is generated by the wire being turned about its own axis, for example by oppositely directed rotation from the two ends. Preferably, the torsion of the sawing wire can be generated by rewinding using an unwinding arm. For example there can be a sawing wire according to the prior art being unwound from a wire reel by means of an unwinding device, known as a flyer, and being wound back onto a sawing wire reel vertically or horizontally. This unwinding and rewinding results in a defined torsion being imparted to the sawing wire. The sawing wire reel bearing the sawing wire according to the invention is then used as a so-called source or dispenser reel in a wire saw according to the prior art.

However, it is also preferable to use a wire saw reel having a sawing wire in accordance with the prior art as a source or dispenser reel in a wire saw and to turn the sawing wire by means of a twisting device. The twisting device is desirably positioned in front of or behind the wire web.

Over a sawing wire length of preferably 150 to 1500 mm, particularly preferably from 300 to 1000 mm, the torsion of the sawing wire amounts to 360°. Over a wire length of preferably 150 to 1500 mm, and particularly preferably of 300 to 1000 mm, a sawing wire is turned through 360° by means of a twisting device. Desirably, the twisting device is positioned in front of or behind the wire web. The sawing wires used are coated or uncoated wires with a thickness of from 80 to 500 $\mu$m and a tensile strength of >2000 N/mm².

The rotation of the sawing wire according to the invention during the cutting and lapping, in particular of hard brittle workpieces, leads to an improved surface quality of the wafers. In particular this leads to a reduced roughness and rippling in the surface of the wafers. Furthermore, improved geometry characteristics (wedge effect) are achieved and shortened process times are achieved.

BRIEF DESCRIPTION OF THE DRAWINGS

Other objects and features of the present invention will become apparent from the following detailed description considered in connection with the accompanying drawing which discloses embodiments of the present invention. It should be understood, however, that the drawing is designed for the purpose of illustration only and not as a definition of the limits of the invention.

In the drawing, wherein similar reference characters denote similar elements throughout the several views:

The figure shows the performance of the sawing wire according to the invention and of the method on the basis of the roughness distribution.

DETAILED DESCRIPTION OF PREFERRED EMBODIMENTS

EXAMPLE

Quality fluctuations with regard to the cut-lapped wafer surfaces and wafer geometries are reduced by the use of the sawing wire according to the invention. The roughness of the surface of a semiconductor wafer of a cut-lapped semiconductor ingot was determined at 5 measurement points using a perthometer. The mean was calculated from the 5 measured values. This mean is shown as a point in the drawing figure.

The surfaces of the wafers which were produced by means of cutting and lapping using a sawing wire according to the prior art have a roughness distribution of between 0.40 and 0.60 $\mu$m (shown on the left). The surfaces of the wafers which were produced by means of cutting and lapping using the sawing wire according to the invention no longer exhibit any roughness distribution. The roughness is constant and is approximately 0.32 μm (shown on the right). The sawing wire according to the invention had a torsion of 360° over a wire length of 700 mm and was used in a wire saw according to the prior art.

The sawing wire according to the invention is advantageously used in wire saws for the cutting and lapping of hard brittle workpieces, in particular semiconductor ingots, in order to produce semiconductor wafers, such as silicon wafers. The semiconductor material can also be indium phosphide, germanium arsenide, and gallium arsenide.

Accordingly, while a few embodiments of the present invention have been shown and described, it is to be understood that many changes and modifications may be made thereunto without departing from the spirit and scope of the invention as defined in the appended claims.

What is claimed is:

1. A method for the simultaneous cutting and lapping of a multiplicity of wafers from a hard brittle workpiece comprising simultaneously cutting and lapping of a multiplicity of wafers from a hard brittle workpiece in a wire saw with a sawing wire which runs helically over wire-guide rollers and forms a wire web, and supplying a cutting-lapping agent to the sawing wire of the wire saw;

causing said sawing wire to execute a rotary movement during the cutting and lapping of the multiplicity of wafers from the hard brittle workpiece; and rotating the sawing wire from 1 to 10 times over a wire length of 1500 mm.

2. The method of claim 1, wherein the wafers are semiconductor wafers.

3. The method of claim 2, wherein the semiconductor wafers are silicon wafers.

4. The method of claim 1, comprising rotating the sawing wire from 2 to 5 times over a wire length of 1500 mm.

5. A method for the simultaneous cutting and lapping of a multiplicity of wafers from a hard brittle workpiece comprising simultaneously cutting and lapping of a multiplicity of wafers from a hard brittle workpiece in a wire saw with a sawing wire which runs helically over wire-guide rollers and forms a wire web, and supplying a cutting-lapping agent to the sawing wire of the wire saw;

causing said sawing wire to execute a rotary movement during the cutting and lapping of the multiplicity of wafers from the hard brittle workpiece; and providing said sawing wire over a wire length of 150 to 1500 mm with a torsion of 360°.

6. The method of claim 5, comprising providing said sawing wire over a wire length of 300 to 1000 mm with a torsion of 360°.

* * * * *